July 13, 1948. J. W. WIESMANN 2,445,198
WIRE DISTRIBUTING SYSTEM
Filed Oct. 18, 1944 3 Sheets-Sheet 1
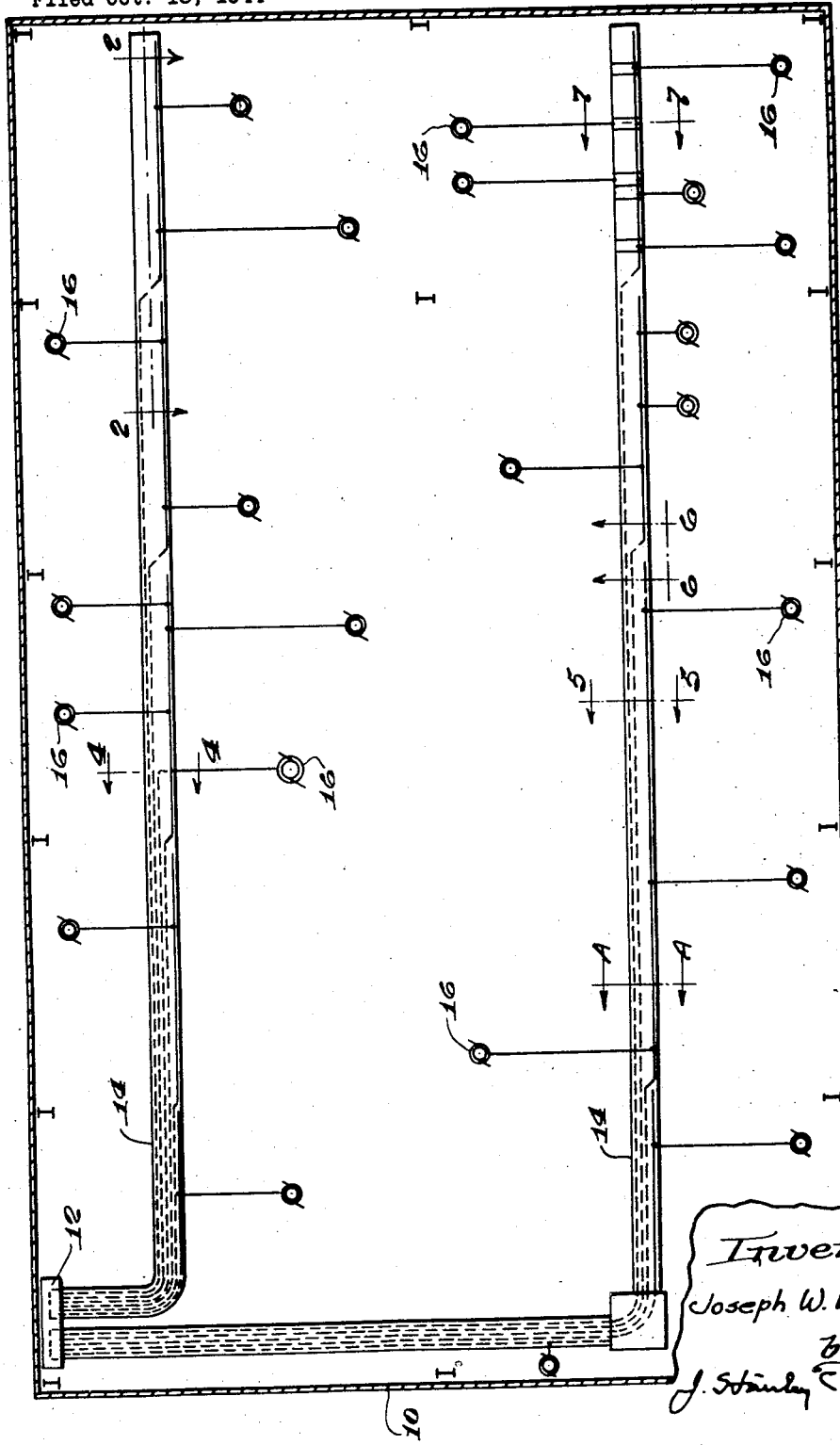

July 13, 1948.  J. W. WIESMANN  2,445,198
WIRE DISTRIBUTING SYSTEM
Filed Oct. 18, 1944  3 Sheets-Sheet 2
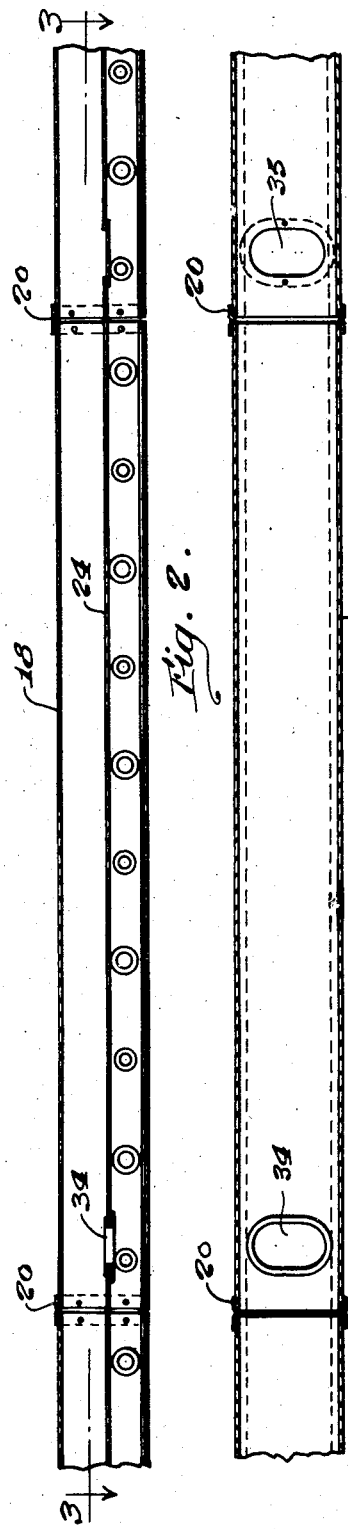
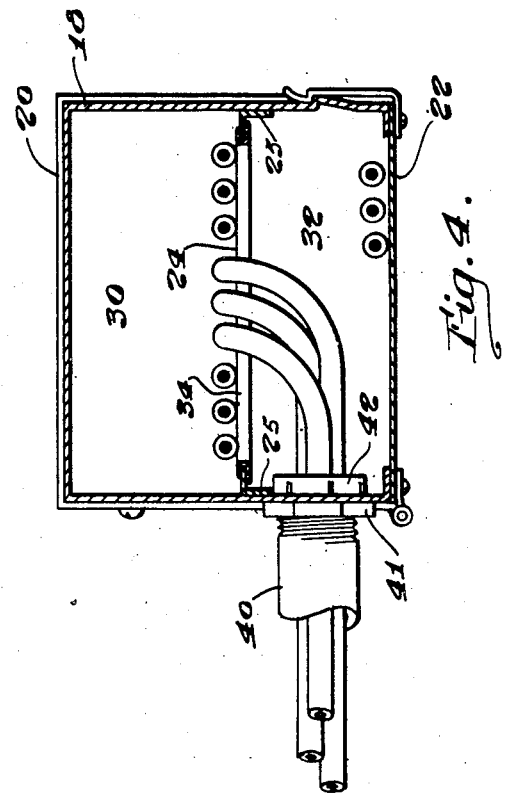
Inventor.
Joseph W. Wiesmann
by J. Stanley Churchill
Atty July 13, 1948.    J. W. WIESMANN    2,445,198
WIRE DISTRIBUTING SYSTEM
Filed Oct. 18, 1944    3 Sheets-Sheet 3
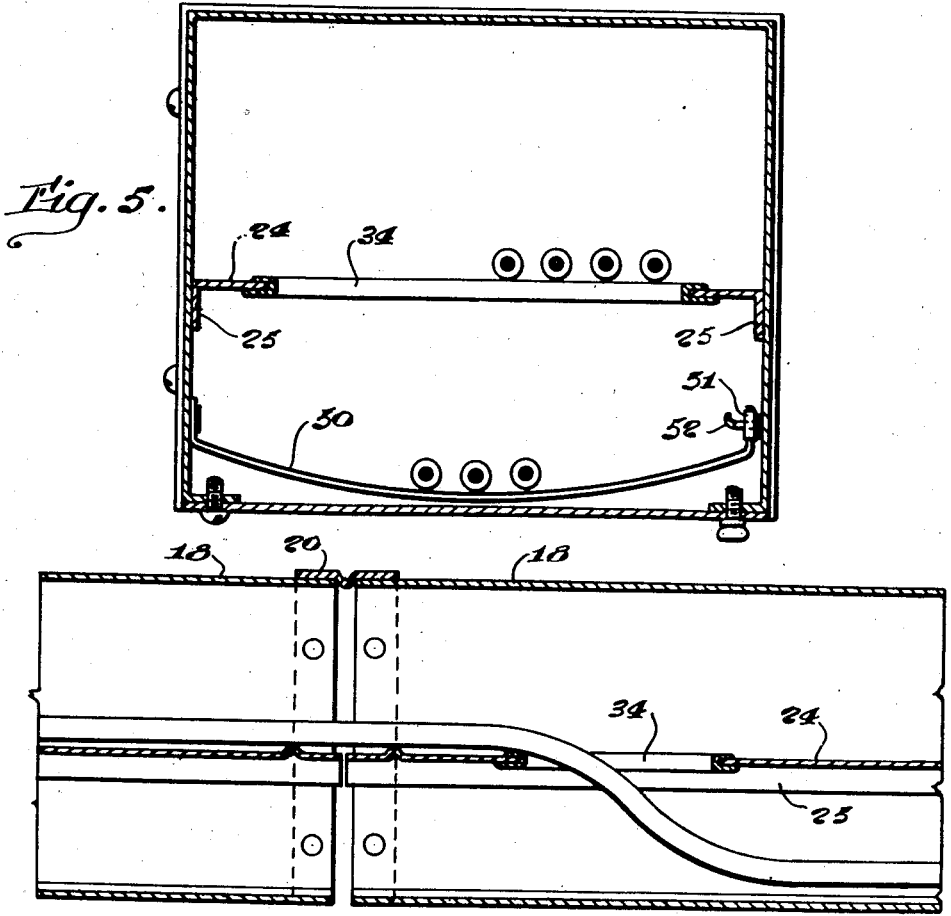
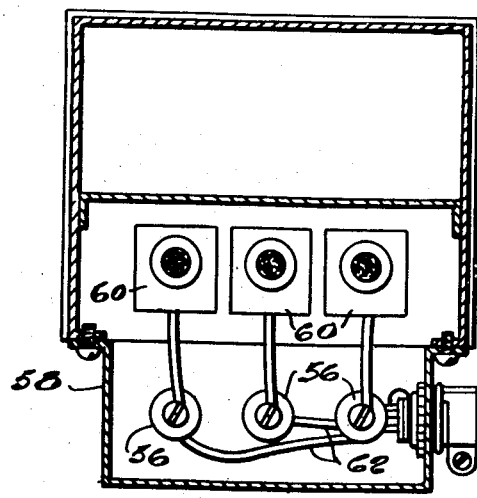
Inventor.
Joseph W. Wiesmann
by J Stanley Churchill
Atty Patented July 13, 1948

2,445,198

UNITED STATES PATENT OFFICE 2,445,198

WIRE DISTRIBUTING SYSTEM

Joseph W. Wiesmann, Pittsburgh, Pa., assignor to H. H. Robertson Company, Pittsburgh, Pa., a corporation of Pennsylvania Application October 18, 1944, Serial No. 559,192

2 Claims. (Cl. 174—99)

1

This invention relates to a wire distributing system and to a wiring duct for use in the wire distributing system.

The invention has for an object to provide a novel and improved wire distributing system by which wiring may be conducted in a novel and improved manner to selected service areas in a building or similar structure to the end that a more flexible, efficient and safer distribution of wiring may be effected than with other systems now upon the market.

With this general object in view, and such others as may hereinafter appear, the invention consists in the wire distributing system and in the wiring conduit hereinafter described and particularly defined in the claims at the end of this specification.

In the drawing illustrating the preferred embodiment of the invention, Fig. 1 illustrates diagrammatically a plan of a building structure having a series of different service areas to which electrical power may be distributed in accordance with the present invention; Fig. 2 is a longitudinal section through the present wire distributing conduit taken on the line 2—2 of Fig. 1; Fig. 3 is a cross-section taken on the line 3—3 of Fig. 2; Fig. 4 is a cross-sectional view taken on the line 4—4 of Fig. 1; Fig. 5 is a cross-sectional view taken on the line 5—5 of Fig. 1; and Figs. 6 and 7 are sectional views taken on the lines 6—6 and 7—7 of Fig. 1 viewed in the direction of the arrows.

Prior to the present invention it has been the usual practice to distribute wiring to the different locations or areas within a building by means of a metal conduit referred to in the trade as a wireway. In accordance with such practice, the electrical power lines are brought into the building to a power panel from which the individual wires for operating motors, lights and other electric instrumentalities in the factory or building are distributed through a wireway or conduit connected with the power panel. These wireways as heretofore constructed have comprised rectangular sheet metal ducts forming a continuous conduit extending from the power panel over the several areas of the building to be serviced by the wiring which they are designed to house. In practice the wireways are usually installed at the ceiling of the building or run under the beams or bottom chord of the frame of the building at the ceiling line and usually extend through a bay or factory aisle so as to permit individual circuits to motors or other instrumentalities located in different areas on each side of

2 the wireway to be led from the wireway at a point nearest to the location of the particular motor or instrumentality. In practice these wireways are sold commercially in three different sizes, 2½" x 2½", 4" x 4" and 6" x 6", and the installation is made up of a series of standard lengths of duct coupled together to form a continuous conduit extending over the desired portion or area of the building to be serviced. The unit length in practice has been five feet and each length is equipped with a removable cover, usually a hinged cover, arranged to constitute one side of the duct. The remaining three sides of the duct are provided with spaced knockouts usually formed by circular punchings, extending partially through the wall allowing relatively easy removal of the knockout so as to permit convenient attachment to the wiring extending through the wireway of rigid, flexible or other wiring from the motor or other instrumentality, the latter being usually located below and some distance away from the wireway which is servicing it.

The wireways usually contain a relatively large number of wires in the form of a plurality of circuits or branches of wiring (a circuit or branch consisting of two, three, four or five wires). One circuit may feed an individual motor or other instrumentality or a group of motors or instrumentalities. Normally the total number of wires at any one location is limited by code to 30 with the further limitation that no more than 20% of the area of the wireway may be occupied. Depending upon conditions surrounding each particular installation, the number and size of wires tend to change caused by relocation of machines, additional machines, changes in the sizes of motors, and for other reasons.

From the foregoing description of the prior art it will be appreciated that at those locations along the wireway where the maximum number of wires are contained, considerable difficulty has been encountered with these prior wireway installations, in the identification of the individual circuits, in the installation of new additional wiring, and also in withdrawing wiring no longer needed. In those instances where wiring for a new motor or device is being attached to a present circuit within the wireway it is often difficult to locate the correct circuit and may be difficult to make a proper splice to the existing wiring because of the crowded conditions of the duct.

The present invention contemplates a wire distributing system of the character specified embodying more flexible, efficient and safer means of distribution of the wiring than has heretofore been possible, and to this end the wiring is conducted from a central source of power through a conduit which is sub-divided horizontally to form an upper and a lower compartment. The lower compartment is provided with a cover affording access to the lower compartment. The main body of the wiring is arranged to extend through the upper compartment and the latter may be regarded as comprising the "through compartment." In accordance with one feature of the invention provision is made for enabling selected portions of the wiring to extend from the "through compartment" down into the lower or working compartment where access may be had to it through the cover opening above referred to. With this arrangement the work of splicing and other connections to be made to any selected wiring may be easily and safely performed due to its accessibility in the working compartment because of the absence of other wiring at the point of splice, and identification of the proper wires and circuits at the point of use is thus more easily and safely accomplished.

Referring to the drawings, 10 represents in sectional plan a building or factory in which the present improved wire distributing system is utilized. As illustrated in Fig. 1 power is brought into the building at the panel box 12 and is distributed through the wireways 14 embodying the present invention to individual motors or other instrumentalities 16 located in various areas throughout the building. The wireways 14 are arranged to extend along the length of the building at such points as to enable the wiring to service the motors or other instrumentalities 16 located on opposite sides of and spaced at varying distances from both sides of the wireways.

In accordance with the present invention, and as shown in detail in Figs. 2 to 7, the wireways are made up of a series of lengths 18 of sheet metal duct connected together by coupling members 20 riveted or otherwise secured to the adjacent ends of the lengths of the duct so as to form a continuous conduit leading from the panel box 10 to the end portion of the building through which it is desired to supply the service. The duct 18 is provided with a cover 22 removably secured thereto to afford access to the lower portion of the interior of the duct and each length of the duct is provided with a partition member 24 herein shown as comprising a sheet metal member provided with flanges 26 on opposite sides thereof which are welded or otherwise secured to the interior of the duct and the partition members serve to sub-divide the entire duct or raceway into an upper compartment 30 and a lower compartment 32.

Preferably the partition members are provided with a series of openings 34 therein, spaced at intervals along the partition members, affording access from the upper compartment 30 to the lower compartment 32, and as illustrated in Figs. 2, 3 and 4 the openings are preferably elongated in shape and arranged to extend transversely of the partition member to facilitate the extension of selected wiring from the upper to the lower compartment. The openings 34 may and preferably will be normally closed by knockouts 35 which can be readily removed to form the openings 34 when the wiring is to be extended through any particular opening. Preferably the openings are bushed to protect the insulation of the wiring.

Referring now to Fig. 1, it will be observed that from the power panel box 12 the wiring for servicing all of the different instrumentalities in the different areas extending across the building is arranged to extend through the upper compartment, and in this respect the upper compartment may be regarded as the through compartment. Progressively from the power panel toward the end of the wireway successive desired circuits for servicing the respective instrumentalities at the various areas along the wireway may be conveniently drawn or extended down through one of the openings 34 near the location of the particular instrumentality and the connection made to the instrumentality by means of wiring led from the wireway through an opening formed in one of the side walls of the wireway conduit. Preferably the side wall or walls of the conduit in the lower or working compartment may be provided at spaced intervals with knockouts as shown in Fig. 2. As illustrated in Fig. 4, the wiring may be led to without the wireway and connected to the instrumentality by being drawn through a rigid or flexible conduit 40, the end of which may be threaded and secured in fixed relation to the wall of the wireway by cooperating nuts 41, 42 as shown. If desired the lead wires may be spliced to the wiring in the work compartment. In some instances it may be desirable to service several instrumentalities at different locations in the same general area and in such instances the individual circuits may be conducted through conduits and the like secured to the walls of successive openings from which the knockouts in the same length of wireway have been removed.

Prior to the present invention the general practice has been to draw in or to fish all of the wiring into or through the single compartment of the wireway and an additional feature of the present invention contemplates a structure wherein the wiring may be conveniently "laid in" within the lower compartment. It is preferred to employ non-conducting flexible wire supporting straps 50, as for example of woven cotton, nylon, glass, etc., supported from the sides of the wireway within the lower compartment and arranged so that at least one and preferably several straps are provided for each unit length of wireway. One side 51 of each strap is preferably arranged to be supported upon a hook 52 and when the end of the strap is removed from the hook 52 the wire may be conveniently placed within the duct through the opening in the bottom wall thereof and the strap 51 then repositioned and hooked over the hook 52. This structure is also disclosed in my co-pending application Serial No. 559,191, filed concurrently.

The two compartment conduit of the present wireway lends itself to use as a substitute for a busway, and, as is known, a busway consists of a sheet metal duct containing conductors in the form of bars, usually of bare copper, supported by insulators. For use in servicing motors and other current consuming devices, the busways are devised so that at fixed intervals a current limiting plug contact may be made to the conductors of the busway. As heretofore commercially available, busway installations have been expensive and a need has existed for a more inexpensive substitute therefor. As illustrated in Fig. 7 and also at the portion indicated at A—A in Fig. 1, the lower or working compartment 32 of the conduit is used to house in the area being serviced only those circuit wires required for the servicing of the motors or other instrumentalities, the wires to other areas being conducted in the upper or through compartment. By reason of the fact that the lower compartment contains only the required circuit wires, it is feasible to use standard wire as a substitute for bus bar with clear space available to make adequate splices from the leads thereto. The current limiting connections 56 may be housed within a supplemental housing 58 bolted or otherwise secured to form a closure for the usual opening at the bottom of the working compartment. In this connection the cover member which is normally used to close such opening is dispensed with. The circuit wires within the lower compartment may and preferably will be mounted in insulated cable taps 60 to which the current limiting connections may be readily made. The lead wiring 62 may and preferably will be run outwardly through the side of the housing, as shown in Fig. 7, through a rigid or flexible metallic conduit 64 or may comprise a "drop cable" leading to the motor or other instrumentality to be serviced. Since the wiring to which the tap is made serves only a relatively small area within the building the system lends itself to more ready deenergization than the conventional busway, particularly as only a small portion of the plan need be deenergized at one time.

While the preferred embodiment of the invention has been illustrated and described, it will be understood that the invention may be embodied in other forms within the scope of the following claims.

Having thus described the invention what is claimed is:

1. A wireway for distributing wiring to different areas of a building comprising a long sheet metal conduit adapted to be erected in the building to extend in a horizontal direction across a plurality of different areas of the building to which it is desired to provide electrical service, said conduit being provided with a horizontally disposed partition member coextensive with the conduit arranged to subdivide the interior of the conduit into an upper and a lower compartment, the said upper compartment having permanently closed outer walls and the bottom of the conduit being provided with closure means adapted when opened to afford ready access to the lower compartment only, the partition member being provided with spaced openings along the length thereof through which wiring from the upper compartment may be drawn down into the lower compartment, whereby the upper compartment may serve as a through way for containing the major portion of the wiring and whereby the circuits for servicing the areas intermediate the ends of the conduit may be drawn at intervals along the length of the partition member from the upper to the lower compartment.

2. A wireway for distributing wiring to different areas of a building comprising a long sheet metal conduit adapted to be erected in the building to extend in a horizontal direction across a plurality of different areas of the building to which it is desired to provide electrical service, said conduit being provided with a horizontally disposed partition member coextensive with the conduit arranged to subdivide the interior of the conduit into an upper and a lower compartment, the said upper compartment having permanently closed outer walls and one wall of the lower compartment being provided with closure means adapted when opened to afford ready access to the lower compartment only, the partition member being provided with spaced openings along the length thereof through which wiring from the upper compartment may be drawn down into the lower compartment, whereby the upper compartment may serve as a through way for containing the major portion of the wiring and whereby the circuits for servicing the areas intermediate the ends of the conduit may be drawn at intervals along the length of the partition member from the upper to the lower compartment.

JOSEPH W. WIESMANN.

REFERENCES CITED

The following references are of record in the file of this patent:

UNITED STATES PATENTS

| Number | Name | Date |
|---|---|---|
| 335,045 | Sprague | Jan. 26, 1886 |
| 380,757 | Hart | Apr. 10, 1888 |
| 1,132,048 | Trego | Mar. 16, 1915 |
| 1,217,398 | Bonnell | Feb. 27, 1917 |
| 1,718,253 | Putnam | June 25, 1929 |
| 2,023,433 | McConnell | Dec. 10, 1935 |

FOREIGN PATENTS

| Number | Country | Date |
|---|---|---|
| 373,335 | Great Britain | May 26, 1932 |